UNITED STATES PATENT OFFICE.

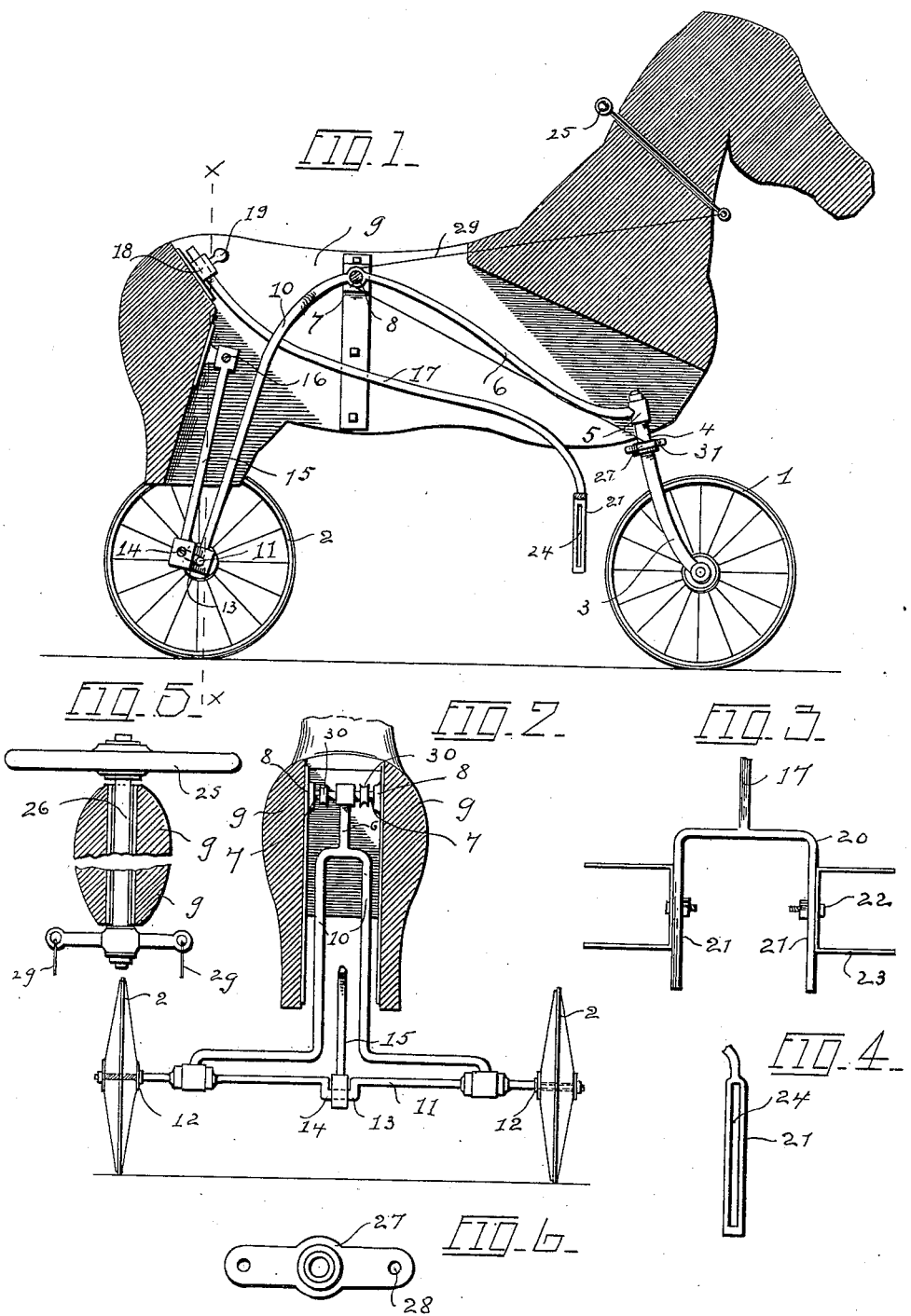

RUDOLPH EBERHARD, OF LOS ANGELES, CALIFORNIA.

TRICYCLE ROCKING-HORSE.

SPECIFICATION forming part of Letters Patent No. 614,375, dated November 15, 1898.

Application filed February 15, 1897. Serial No. 623,453. (No model.)

*To all whom it may concern:*

Be it known that I, RUDOLPH EBERHARD, of Los Angeles, county of Los Angeles, and State of California, have invented certain new and useful Improvements in Tricycle Rocking-Horses; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a tricycle rocking-horse, and has for its object to provide a rocking-horse with mechanical means for propulsion by the rider by simply causing the horse proper to rock upon its pivot, while the act of propulsion by this motion shall be in the full enjoyment of the ordinary motion of a horse while traveling.

A further object is to provide a convenient means for impelling the mechanism by means of the pressure of the feet of the rider and also by a pull upon the handle-bar, with convenient means for guiding the propelling mechanism.

The invention consists in the parts and combination of parts hereinafter described, and pointed out in the claim.

In the drawings, Figure 1 is an elevation, partly in section, showing my invention. Fig. 2 is a vertical cross-section on lines x x, Fig. 1. Fig. 3 is a detail view of the stirrups. Fig. 4 is a detail view of one of the stirrup-arms, showing the elongated slot by which the stirrup is adjusted. Fig. 5 is a front elevation of the handle-bar; and Fig. 6 is a plan view of the under plate of the steering-post, to which the steering cords or ropes are attached.

1 designates the front and 2 the rear wheels. The front wheel 1 is journaled in a fork 3, having a reduced portion 4, which turns freely in the tubular end 5 of a suspension-bar 6. Bar 6 is curved upwardly and at its highest point of curvature is provided with a trunnion 7, upon the pivots 8 of which is pivotally mounted the body portion 9 in representation of a horse, whereby the body 9 may have a rocking motion. The suspension-bar 6 from the point of the trunnion 7 curves downwardly and terminates in a fork 10, which is secured in the axle 11, upon which the hind wheels 2 are journaled at 12. Axle 11 is formed with a crank portion 13 centrally of its length, upon which is mounted crank 14, connected with pitman 15 to the rear portion of the body of the horse in pivotal relation at 16. By this arrangement it will be seen that a rocking motion of the horse upon the trunnion will communicate a rotary movement to the crank 14, thereby propelling the tricycle body portion and horse. To assist in steering the oscillatory movement of the body portion to communicate the proper rotary movement of crank 14 and wheels 2, there is a stirrup-bar 17, attached to the rear portion of the horse-body at 18, preferably by being run through an eye and secured by a thumb-screw 19, and at the lower end of the bar 17 is a rectangular yoke 20, having slotted side bars 21, in which are run bolts 22 to secure stirrups 23 thereon. The slot 24 of the side bars allows of vertical adjustment of the stirrups to suit the length of the leg of the rider.

25 designates the handle-bar, through which passes a rod 26 of a length to pass entirely through the neck of the horse, and upon the lower end is secured a plate 27, having orifices 28 at each end, to which is attached a steering-cord 29, one running upon each side of the horse, and the steering-cord passes over pulleys 30, mounted upon the trunnion, and from thence passes to a plate 31, secured upon the fork. By this construction it will be seen that turning the rod 26 by means of handle-bar 25 will exert a pull upon one or the other of the cords 29, and thereby turn the fork in which the front wheel is journaled.

I have found that in order to assist in turning corners it is valuable to form one axle-journal of axle 11 round in cross-section to allow one of the wheels 2 to move freely thereon and to form the opposite end of axle 11 rectangular in cross-section and form the opening through the wheel rectangular in cross-section, whereby in the ordinary movement of the tricycle the axle revolves with one of the wheels 2, while the opposite wheel 2 revolves upon the axle.

The great advantage attained by this construction is in turning corners, thereby obviating slipping of either of the wheels on their peripheries.

What I claim is—

In a tricycle rocking-horse, the forward and hind wheels, a fork supporting the former and journaled in the forward end of the suspension-bar, a suspension-bar curved upwardly and extending rearwardly and provided with a central trunnion, pivots passed through said trunnion for supporting the horse, said suspension-bar curving downwardly and terminating in a fork, a curvilinear stirrup-bar attached to the rear portion of the horse, a thumb-screw for attaching the same, a slotted yoke formed on the forward end of the stirrup-bar, whereby the stirrups are attached to the same all substantially as herein specified.

In testimony that I claim the foregoing as my own I hereby affix my signature in presence of two witnesses.

RUDOLPH EBERHARD.

Witnesses:
 WILLIAM WEBSTER,
 H. H. MARTIN.